(12) United States Patent
Hurlbutt

(10) Patent No.: US 7,048,342 B1
(45) Date of Patent: May 23, 2006

(54) HOUSING FOR A BRAKE BOOSTER

(75) Inventor: Ryan M. Hurlbutt, Niles, MI (US)

(73) Assignee: Robert Bosch Corporation, Broadview, IL (US)

( * ) Notice: Subject to any disclaimer, the term of this patent is extended or adjusted under 35 U.S.C. 154(b) by 62 days.

(21) Appl. No.: 10/765,367

(22) Filed: Jan. 27, 2004

(51) Int. Cl.
*B60T 8/44* (2006.01)

(52) U.S. Cl. .................. 303/114.1; 29/510; 92/98 R

(58) Field of Classification Search .. 303/114.1–114.3; 29/510–516; 92/98 R–128, 169.1; 91/369.1–376 R
See application file for complete search history.

(56) References Cited

U.S. PATENT DOCUMENTS

| | | |
|---|---|---|
| 3,083,698 A | 4/1963 | Price et al. |
| 3,146,682 A | 9/1964 | Price et al. |
| 3,158,930 A | 12/1964 | Wesstrom et al. |
| 4,366,612 A | 1/1983 | Dorsett et al. |
| 5,074,024 A | 12/1991 | Gautier |
| 5,297,471 A | 3/1994 | Graichen et al. |
| 6,390,567 B1 | 5/2002 | Hurlbutt |

*Primary Examiner*—Christopher P. Schwartz
(74) *Attorney, Agent, or Firm*—Leo H McCormick, Jr.; Warren Comstock

(57) ABSTRACT

A brake booster having a first shell joined to a second shell through a flange (26) on the first shell and a peripheral surface (204) on the second shell. Axial slots (36,36', ... 36") on the flange that extend from an opened end toward a shoulder engage radial slots (38,38', ... 38") to create a first plurality of arcuate projections (40,40', ... 40") that are sequentially separated from a second plurality of arcuate projections (42,42', ... 42"). Each arcuate projection (40) has parallel sides that extend from a radial plane (11) on the flange while each arcuate projection (42) has first and second radial tabs (44, 46) thereon. Each arcuate projection (40) is deformed into sealing engagement with an edge (206) on the peripheral surface (204) to position the peripheral surface (204) under the flange while creating an axial gap (x) between the radial tabs (44,46) and the edge (206) to provide a visual inspection of the sealing engagement.

6 Claims, 2 Drawing Sheets

HOUSING FOR A BRAKE BOOSTER

This invention relates to a unitary sealed housing for a brake booster created by joining a first shell to a second shell.

BACKGROUND OF THE INVENTION

U.S. Pat. Nos. 3,083,698 and 3,158,930 disclose brake boosters having a housing manufactured through a well known method wherein an end surface on a first shell is crimped by cutting or shearing tabs that engage a surface on a second shell to define a unitary structure. It is a common practice to spray paint the exterior surface of the shells to protect against oxidation of the shells that are exposed to the environment when installed in a vehicle. The crimped joints function in an adequate manner to seal the interior of the unitary structure for use as a housing for a brake booster. Unfortunately, the painting process while effective often did not provided a uniform protection over the entire exterior surface of a shell and as a result some oxidation could occur after a period of time. In an effort to better protect the shells, a process known as e-coating was developed which uniformly coats the shell and this process is now an accepted standard for protection with respect to oxidation. However, in the crimping process through which the first shell is joined to the second shell certain portions of the first shell are either sheared or stretched such that the sheared portion of the first shell has bare metal exposed to the environment and over a period of time this bare metal oxidizes and creates an undesirable appearance for the brake booster. While it would be possible to re-coat or touch up the bare or exposed metal after crimping, the time, effort and labor involved would add considerable cost to the manufacturing process which a customer would be hesitant to absorb as no tangible functional benefit of the brake booster would occur from such added effort.

U.S. Pat. No. 6,390,567 discloses structure and a method of manufacturing a brake booster wherein essentially all surfaces are protected from exposure to the environment. In this brake booster a first shell a flange having a plurality of slits and slots thereon is deforming mid point of the slots to engage a peripheral surface on a second shell and create a sealed housing. This sealed connection in a stable and non-corrosive condition however under certain conditions, corrosion may occur on the peripheral surface on the second shell as certain portions are exposed to the environment.

SUMMARY OF THE INVENTION

A primary object of the present invention is to provide a housing for a brake booster where after a crimping or deformation process of a flange through which a first shell is joined to a second shell to define a sealed unitary structure, the entire peripheral surface on an opened end of the second shell is covered by the flange on the first shell.

According to this invention, a housing for a brake booster is manufactured by deforming a first peripheral surface on a coated first shell toward an axial center of a coated second shell. The deformed first peripheral surface axially compresses a bead on a diaphragm located between the first and second shells to seal an interior of the housing from the surrounding environment. The first shell is characterized by a cylindrical body with a closed end and an opened end with the first peripheral surface located on a flange that extends from the opened end toward a shoulder. The flange has a plurality of axial slots that extend from the opened end and engage a corresponding plurality of radial slots to create " $\text{JL}$ " shaped openings and define a plurality of arcuate projections adjacent a corresponding plurality of radial tabs in the flange. The opened end of the second shell and a bead on a diaphragm are urged toward the shoulder by a first force and a second force is applied to deform the arcuate projections toward the axis of the second shell such that a peripheral surface on the opened end of the second shell is located under the flange adjacent the plurality of radial slots to create a compressive force on the bead and join the first shell with the second shell. The axial deformation is limited to the arcuate projections and as a result the flange retains a circular shape and the peripheral surface of the opened end of the second shell is not exposed to the environment. At the same time an arcuate projection is deformed, the radial tabs are also deformed inwardly to define a secondary engagement surface to prevent the peripheral surface on the opened end from moving away from the shoulder should the arcuate deformation be inadequate to hold the second shell against the shoulder to prevent a seal leak.

An advantage of this invention resides in a method of joining a first shell to a second shell without the exposure of any un-coated surfaces that could oxidize over a period of time in an oxygen rich environment. A still further advantage of this invention resides in a unitary structure wherein a first shell has a flange with a plurality of arcuate projections that engage a peripheral surface on a second shell to define a first holding joint and a plurality of tabs that extend from the flange to define a secondary or back up stop to retain an opened end on a second shell in a fixed relationship with a shoulder on the first shell to create a sealed housing.

Another advantage this invention resides in a capability of visually inspection a joint created between a first shell and a second shell to assure that a sealed relationship is achieved wherein a peripheral surface on an opened end of a second shell is entirely covered by a flange on the first shell.

A still further advantage of the present invention resides in a method of manufacturing a housing for a brake booster wherein deformation of a flange occurs without exposing bare metal to the environment.

DETAILED DESCRIPTION

Figure 1:
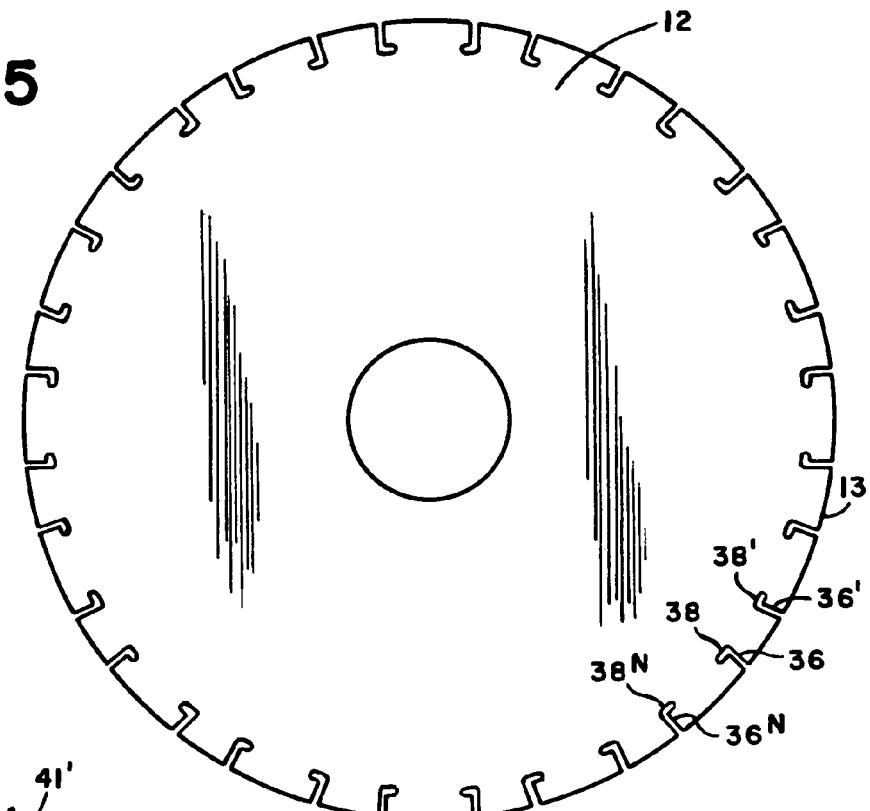
FIG. 1 is a metallic blank from which a first shell for a brake booster is made according to the principals of the present invention.
Figure 2:
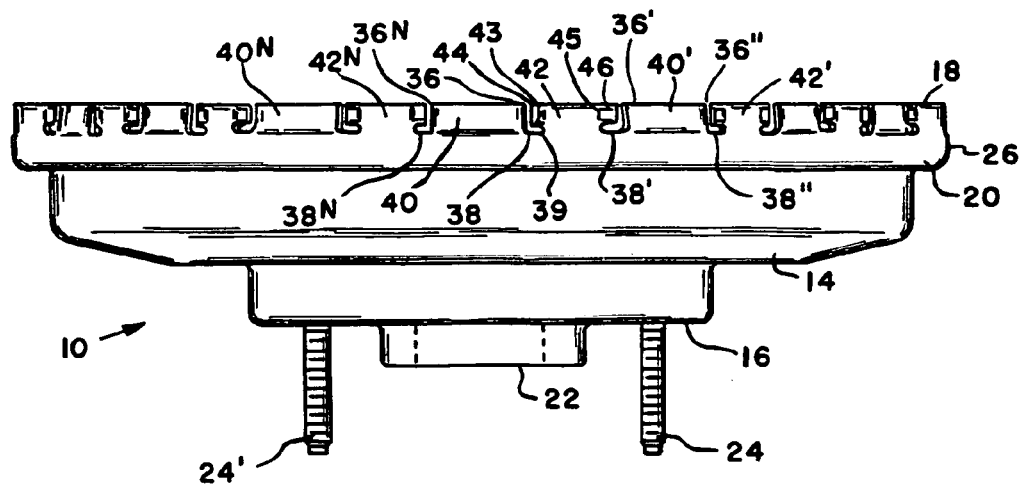
FIG. 2 is a schematic illustration of the first shell formed from the blank of FIG. 1.

FIG. 1 illustrates an essentially circular blank 12 which is formed from a roll stock and later formed into a first shell 10 as illustrated in FIG. 2. The circular blank 12 is initially stamped to create a plurality of axial slots $36, 36', \ldots 36''$ that axially extend from the peripheral surface 13 and engage a plurality of radial slots $38, 38', \ldots 38''$ to create an " $\text{JL}$ " shaped openings adjacent the peripheral surface 13.

Figure 6:
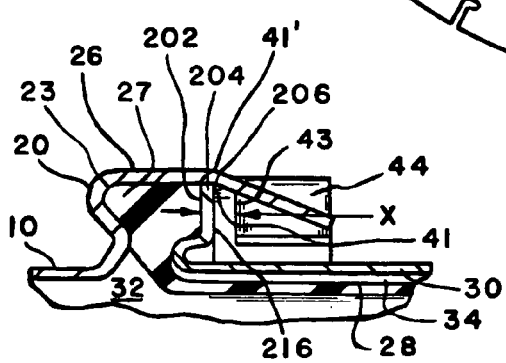
FIG. 6 is a sectional view taken along line 6—6 of FIG. 5.

The circular blank 12 is stamped and rolled to define a first shell 10 with a cylindrical body 14 having a closed end 16 and an opened end 18. The closed end 16 has an axial opening 22 for receiving a valve and a plurality of openings for receiving studs 24,24' to mount a resulting booster 100 on a wall of vehicle. A shoulder 20 is located adjacent the opened end 18 with that portion of the cylindrical body 14 between shoulder 20 and the opened end 18 of shell 10 defining a flange 26. The cross section of flange 26, as best shown in FIG. 6, has a groove 23 for receiving a bead 27 of a diaphragm 28 and an opened end 202 on a second shell 30. The first shell 10 on being joined to the second shell 30 creates a unitary structure with sealed chambers 32 and 34 to create a resulting brake booster 100.

The particular details of flange 26 are best illustrated in FIGS. 2, 4, 5 and 6. After the circular blank 12 is stamped or rolled to define a flange 26, as illustrated in FIG. 2, with the ⊐⌐shaped openings to define a first plurality of arcuate projections 40,40', . . . 40″ that are sequentially separated from a second plurality of arcuate projections 42,42', . . . 42″. A corresponding base 39 for each of the second plurality of radial slots 38, 38', . . . 38″ is located adjacent radial plane 11, shown by dashed lines in FIG. 4 that extends from the axis of the resulting first shell 10. The first plurality of arcuate projections 40,40', . . . 40″ each have substantially parallel axial sides defined by the axial slots 36,36', . . . 36″ that extend from the radial plane 11 that is aligned with a base 39 of the radial slots 38,38', . . . 38″. The second plurality of arcuate projections 42,42', . . . 42″ each have a first 44 and a second 46 radial tab thereon with corresponding edges 43 and 45 that are separated from the base 39 a fixed distance "X" defined by the width of the second plurality of radial slots 38,38', . . . 38″. The first and second radial tabs (44, 46) each have a length defined by the arcuate length of a radial slot (38) less the width of an axial slot (36).

Figure 5:
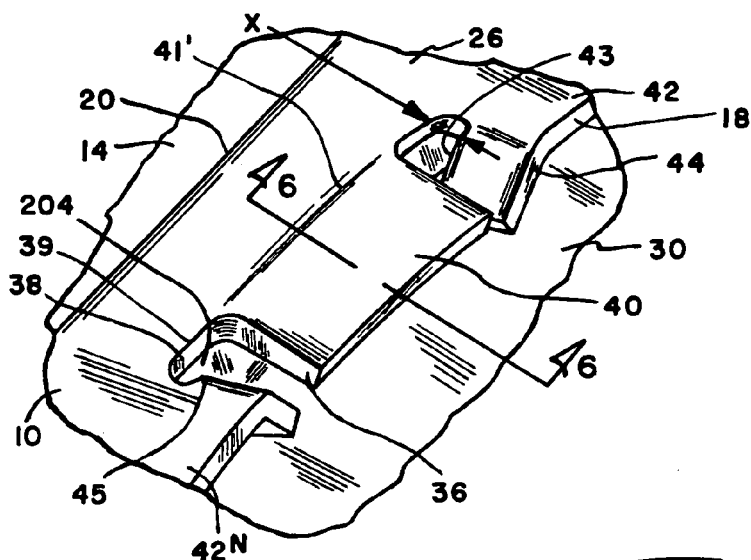
FIG. 5 is an enlarged view of a section of the first and second shell of FIG. 4.
Figure 3:
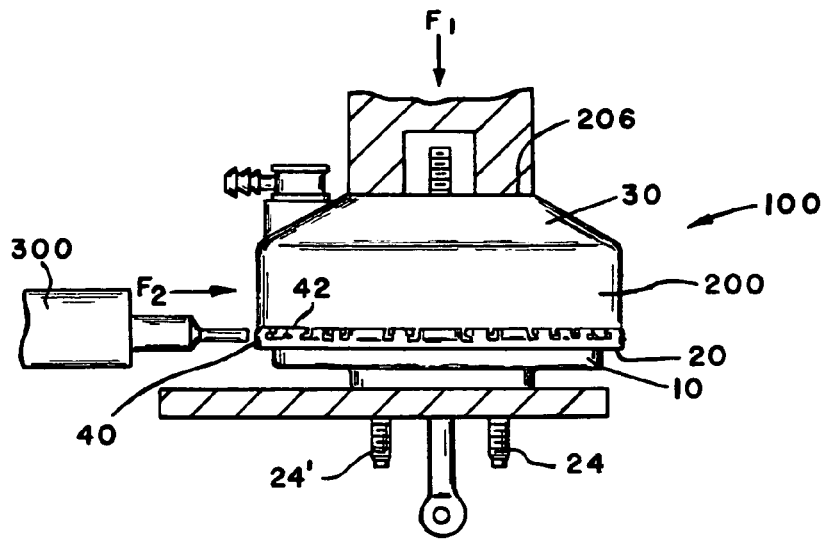
FIG. 3 is a schematic illustration showing a relationship between the first shell of FIG. 2 and a second shell during the assembly of a brake booster.
Figure 4:
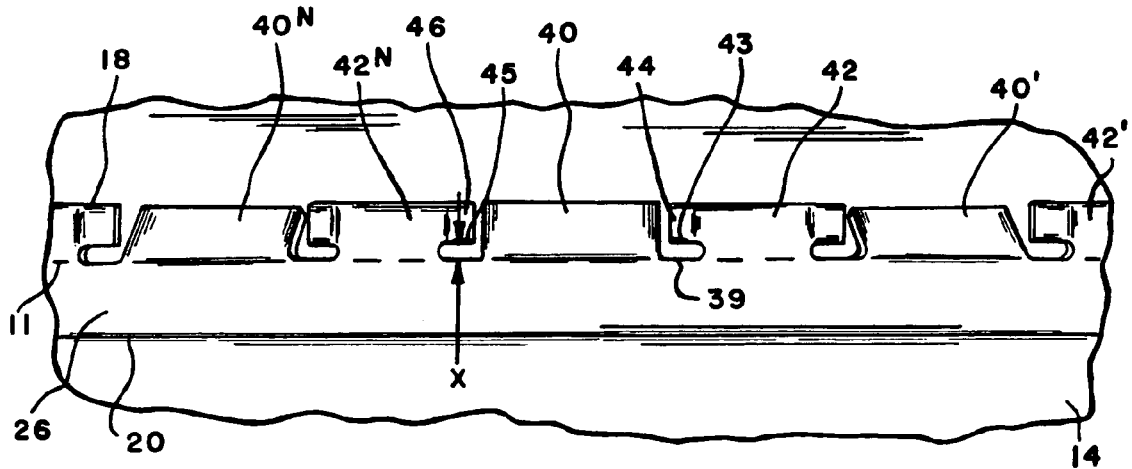
FIG. 4 is an illustration showing a portion of the first and second shells after deformation of the flange.

The resulting first shell 10 is coated with an elastomeric material that inhibits the oxidation of the surface of the shell 10. After shell 10 has been coated, it is ready for assembly with a second shell 30 through a crimping process as illustrated in FIG. 3. In order to perform the crimping process, bead 27 is located in groove 23 adjacent shoulder 20 and a force is applied to bring shell 30 toward shell 10 such that an edge 206 on peripheral surface 204 of the opened end 202 of shell 30 is brought into alignment with radial plane 11. Thereafter a force is applied to the arcuate surface of the first plurality of arcuate projections 40, 40', . . . 40″ by ram 300 such arcuate surface 41 engages edge 206 and holds opened end 202 in a fixed position with respect to shoulder 20 to form a unitary structure with the interior sealed from the surrounding environment, as shown in FIGS. 4, 5 and 6. The deformation of the first plurality of arcuate projections 40,40', . . . 40″ with respect to the cylindrical surface of the flange 26 is between 14–20 degrees and as a result the coating has sufficient elasticity that cracks are not created along the point of engagement 41' on the top or 41 on the bottom 41 of the arcuate projections 40,40', . . . 40″ of shell 10 and neither the peripheral surface 204 nor the opened end 202 of shell 30 is exposed to the surrounding environment as they are entirely covered by flange 26.

At the same time the first plurality of arcuate projections 40,40', . . . 40″ are being deformed, the die associated with ram 500 also acts on tabs 44 and 46 to radially bend the tabs toward the axial center of shell 10. The angle of the bend is between 40 and 45 degrees with respect to a tangent for the cylindrical flange 26 but because of the gap defined by the fixed distance X, edges 43 and 45 do not at this time engage anything but do provide an indication of the formation of the seal formed by the joint. The length of each of the plurality of the first plurality of arcuate projections 40,40', . . . 40″ is such that the deformation that takes place does not appreciably effect the eccentricity of the cylindrical body 14 and as a result the opened end 18 adjacent flange 26 retains a circular shape.

METHOD OF ASSEMBLY

The manufacture of a brake booster 100 having a housing with a first shell 10 joined to a second shell 30 in accordance with the principals of the present invention can be achieved through the following steps in an assembly process.

A first shell 10 is selected from a supply source. The first shell 10 having been stamped and its entire external surface coated with an oxidization protecting coating. The first shell 10 is characterized by a cylindrical body 14 with a closed end 16 and an opened end 18. A shoulder 20 is located adjacent the opened end 18 to define a flange 26. The flange 26 has a first plurality of axial slots 36,36', . . . 36″ that axially extend from the opened end 18 toward the shoulder 20 and engage a second plurality of radial slots 38,38', . . . 38″ to create an "⊐⌐" shaped openings adjacent a radial plane 11 with respect to the axis of the shell 10. The "⊐⌐" shaped openings define a first plurality of arcuate projections 40,40', . . . 40″ that are separated from a second plurality of arcuate projections 42,42', . . . 40″ such that each of the first plurality of arcuate projections 40,40', . . . 40″ have substantially parallel axial sides that are perpendicular with a base 39 of the radial slots 38,38', . . . 38″ associated with that second plurality of arcuate projections 42,42', . . . 42″ and radial plane 11. Each of the second plurality of arcuate projections 42,42', . . . 42″ have a first 44 and a second 46 radial tab that are separated from the base 39 by a fixed distance X defined by the width of the second plurality of radial slots 38,38', . . . 38″.

A second shell 30 is selected from a supply. The second shell 30 having been stamped to define a cylindrical body 200 with an opened end 202 and a closed end 206. The cylindrical body 200 has a peripheral surface 204 adjacent the opened end 202 that is located in a radial plane to the axis of the second shell 30. After the second shell 30 is stamped, its entire external surface coated with an oxidation protection coating.

The first shell 10 is located in a fixture of a type illustrated in FIG. 3 with valve components and movable wall of a brake booster already assembled therein and a bead 27 of a diaphragm 28 located in groove 23 on flange 26 adjacent shoulder 20 to define a chamber 32 within the first shell 10.

Thereafter, the second shell 30 is placed on top of the first shell 10 such that opened end 202 engages bead 27 and is received into flange 26, as shown in FIG. 6.

A first force $F^1$ is applied to the second shell 30 which moves the second shell 30 toward the first shell 10 to compress bead 27 between opened end 202 and shoulder 20. This force compresses bead 27 until edge 206 the peripheral surface 204 is located adjacent radial plane 11, as illustrated in FIGS. 5 and 6.

A second force $F^2$ provided by a single hydraulic ram 300 is radially applied by a die to bend the first plurality of arcuate projections 40, 40', . . . 40″ toward the axial center of the second shell 30 bring surface 41 thereon into engagement with edge 206 on the second peripheral surface 204 such that chambers 32 and 34 are sealed from the surrounding environment and the first shell 10 is fixed to the second shell 30, as illustrated in FIGS. 4, 5 and 6. The engagement of surface 41 on the bottom of the first plurality of arcuate projections 40, 40', . . . 40" with edge 206 on the second peripheral surface 204 is along the entire arcuate length of each arcuate project 40.

At the same time the die moved by the second force $F^2$, also acts on tabs 44 and 46 of the second plurality of arcuate projections 42,42', . . . 42" to radially bent the tabs 44 and 46 toward the axis of shell 30 but because of the gap X, tabs 44 and 46 do not touch anything but are bent in such a manner that should the engagement of the surface 41 and edge 206 later deflect, surfaces 43 and 45 would engage edge 216 to limit the movement of opened end 202 away from shoulder 20.

Once ram 300 has completed bending the first plurality of arcuate projections 40,40', . . . 40" toward the axis of shell 30 the resulting sealed joint can be achieved by a visual observance of the existence of gap "X". If more definitive evidence is necessary a tool could be inserted in gap X to confirm the relative positions of the edge 216 with respect to the radial plane 11 to confirm that peripheral surface 204 is covered by flange 26.

In order to test the strength of the joint formed by bending the first plurality of arcuate projections 40,40', . . . 40" into engagement with edge 206 of the second peripheral surface 204 on the second shell 30, the shell 10 and 30 were pulled apart. It was determined that an angle of 14–20 degrees provided an initial holding force of between 3820 to 4350 pounds. In a situation where the second shell 30 was actually pulled away from the shoulder 20 with a force greater that 4350 pounds, the tabs 44,46 engaged the second peripheral surface 216 to prevent bead 27 from separating from the groove 23 and a leak occur across the resulting joint.

I claim:

1. A method of joining a first shell (10) to a second shell (30) to define a housing for a brake booster (100) comprising the steps of:

selecting the first shell (10) from a supply, said first shell (10) having a first cylindrical body (14) with a closed end (16) and a first peripheral surface with a shoulder (20) adjacent an opened end (18) to define a flange (26), said flange (26) having a plurality of axial slots (36,36', . . . 36") that axially extend from said opened end (18) toward said shoulder (20) and engage a plurality of radial slots (38,38', . . . 38") to create a first plurality of arcuate projections (40,40', . . . 40") that are sequentially separated from a second plurality of arcuate projections (42,42', . . . 42"), said first plurality of arcuate projections (40,40', . . . 40") each having substantially parallel axial sides that perpendicularly extend from a radial plane (11) aligned with a base of said radial slots (38,38', . . . 38") while said second plurality of arcuate projections (42,42', . . . 42") each have first and second radial tabs (44,46) thereon with each tab having a length defined by the arcuate length of a radial slot (38) less the width of an axial slot (38);

selecting a second shell (30) from a supply, said second shell (30) having a cylindrical body (200) with a second peripheral surface (204) on an opened end (202);

locating a bead (27) of a diaphragm (28) adjacent said shoulder (20) to define a chamber (32) within said first shell (10);

inserting said second shell (30) into said first shell (10) such that said second peripheral surface (204) engages said flange (26);

moving said second shell (30) toward said first shell (10) to compress said bead (27) between said opened end (202) and said shoulder (20) until an edge (206) on said second peripheral surface (204) is aligned with said radial plane (11) and said second peripheral surface (204) is under said flange (26); and applying an axial force to only bend said first plurality of arcuate projections (40, 40', . . . 40") toward said axial center of said second shell (30) to bring said first plurality of arcuate projections (40,40', . . . 40") into engagement with said edge (206) of said second peripheral surface (204) such that said chamber (32) is sealed from the surrounding environment and first shell (10) is joined with said second shell (30).

2. The method as recited in claim 1 further including the step of applying a axial force to bend said first plurality of arcuate projections (40,40', . . . 40") includes a radial force to only bend said first and second tabs (44,46) on each of said second plurality of arcuate projections (42,42', . . . 42") toward said axial center of said second shell (30) to define a stop (43,45) located at a set distance from said radial plane to define a gap (x) with respect to said edge (206) of said second shell (30), said stop (43,45) limiting the movement of said opened end (202) away from said radial plane (11) should the engagement between said first plurality of arcuate projections (40,40', . . . 40") and said edge (206) allow said opened end (202) to move away from said shoulder (20) and thereby maintain a sealed relationship between said first shell (10) and said second shell (30).

3. The method as recited in claim 2 wherein said first (10) and second (30) shells are coated with a material to prevent oxidization and said deformation of said first plurality of arcuate projections (40,40', . . . 40") toward said axial center of said second shell (30) and into engagement with said edge (206) on said second peripheral surface (204) defines an angle of between 14 and 20 degrees with said flange (26) such that the elastomeric properties of said coating are not exceeded and the surface of said second peripheral surface (204) is not exposed to environmental conditions that could induce oxidization.

4. The method as recited in claim 3 wherein said first (44) and second (46) radial tabs on said second plurality of arcuate projections (42,42', . . . 42") are bent toward said axial center of said second shell (30) along an angle of approximately 45 degrees with respect to a tangent of the said flange (26).

5. The method as recited in claim 4 wherein the engagement said first plurality of arcuate projections (40,40', . . . 40") with said edge (206) on said second peripheral surface (204) in creating gap (x) between said edge (206) and said first (44) and second (46) tabs on said second plurality of arcuate projections (42,42', . . . 42") provides a visual indication of a desired sealing relationship between said first shell (10) and said second shell (30).

6. The booster defined by the method defined in claim 5.

* * * * *